United States Patent

Pham et al.

(10) Patent No.: US 9,448,250 B2
(45) Date of Patent: Sep. 20, 2016

(54) DETECTING MOUNT ANGLE OF MOBILE DEVICE IN VEHICLE USING MOTION SENSORS

(71) Applicant: Apple Inc., Cupertino, CA (US)

(72) Inventors: Hung A. Pham, Oakland, CA (US); Martin M. Menzel, San Jose, CA (US); Sunny Kai Pang Chow, San Jose, CA (US); Xiaoyuan Tu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 643 days.

(21) Appl. No.: 13/913,422

(22) Filed: Jun. 8, 2013

(65) Prior Publication Data

US 2015/0006099 A1 Jan. 1, 2015

(51) Int. Cl.
*G01C 25/00* (2006.01)
*G01B 21/22* (2006.01)
*G01P 15/00* (2006.01)
*G01C 21/26* (2006.01)
*G01C 17/38* (2006.01)

(52) U.S. Cl.
CPC .............. *G01P 15/003* (2013.01); *G01C 17/38* (2013.01); *G01C 21/26* (2013.01)

(58) Field of Classification Search
CPC ...... G01B 21/24; G01C 17/38; G01C 21/16; G01C 21/26; G01P 15/003; G01P 15/18; G06F 3/0346

USPC ............. 702/93, 141, 142; 33/356; 324/202; 701/70, 472, 500
See application file for complete search history.

(56) References Cited

U.S. PATENT DOCUMENTS

| | | | |
|---|---|---|---|
| 7,891,103 B2 | 2/2011 | Mayor et al. | |
| 8,423,255 B2 | 4/2013 | Padmanabhan et al. | |
| 2012/0173140 A1 | 7/2012 | Czompo et al. | |
| 2013/0060467 A1 | 3/2013 | Nash | |
| 2014/0361763 A1 | 12/2014 | Chow et al. | |
| 2015/0354951 A1* | 12/2015 | Ali | G01C 21/16 702/141 |

FOREIGN PATENT DOCUMENTS

WO 2012/080741 6/2012

\* cited by examiner

*Primary Examiner* — John H Le
(74) *Attorney, Agent, or Firm* — Fish & Richardson P.C.

(57) ABSTRACT

Motion sensors of a mobile device mounted to a vehicle are used to detect a mount angle of the mobile device. The motion sensors are used to determine whether the vehicle is accelerating or de-accelerating, whether the vehicle is turning and whether the mount angle of the mobile device is rotating. The mount angle of the mobile device is obtained from data output from the motion sensors and can be used to correct a compass heading. Data from the motion sensors that are obtained while the vehicle is turning or the mobile device is rotating are not used to obtain the mount angle.

20 Claims, 4 Drawing Sheets

US 9,448,250 B2

DETECTING MOUNT ANGLE OF MOBILE DEVICE IN VEHICLE USING MOTION SENSORS

TECHNICAL FIELD

This disclosure relates generally to sensor calibration.

BACKGROUND

Modern mobile devices, such as smart phones, include motion sensors that can be used by a vehicle navigation application to determine the position, speed and heading of a vehicle on which the mobile device is mounted. For navigation applications, the mobile device is often mounted on the dashboard of a vehicle, allowing the user to view turn-by-turn directions provided on a display screen of the mobile device. The user can also be provided with a compass heading on the display screen, allowing the user to determine the direction of travel. To avoid distraction when driving, a driver of the vehicle may rotate the mobile device in their direction to gain a better view of the display screen. Rotating the mounted mobile device, however, can cause errors in compass heading calculations since the sensitive axis of the motion sensor is oriented away from the direction of travel.

SUMMARY

Motion sensors of a mobile device mounted to a vehicle are used to detect a mount angle of the mobile device. The motion sensors are used to determine whether the vehicle is accelerating or de-accelerating, whether the vehicle is turning and whether the mount angle of the mobile device is rotating. The mount angle of the mobile device is obtained from data output from the motion sensors and can be used to correct a compass heading. Data from the motion sensors that are obtained while the vehicle is turning or the mobile device is rotating are not used to obtain the mount angle.

In some implementations, a method comprises: obtaining motion data from a motion sensor of a mobile device mounted to a vehicle, where the motion data is obtained while the vehicle is moving; obtaining a subset of the motion data obtained while the vehicle was not turning and the mobile device was not rotating; obtaining a motion vector from the subset of motion data; and obtaining a mounting angle from the motion vector.

Particular implementations disclosed herein provide one or more of the following advantages. A mobile device mounted to a vehicle and used as a navigation device can be rotated by a user and still generate an accurate compass heading.

Other implementations are disclosed for systems, methods and apparatus. The details of the disclosed implementations are set forth in the accompanying drawings and the description below. Other features, objects, and advantages will be apparent from the description and drawings and from the claims.

DESCRIPTION OF DRAWINGS

The same reference symbol used in various drawings indicates like elements.

DETAILED DESCRIPTION

Example Use Case

Figure 1A:
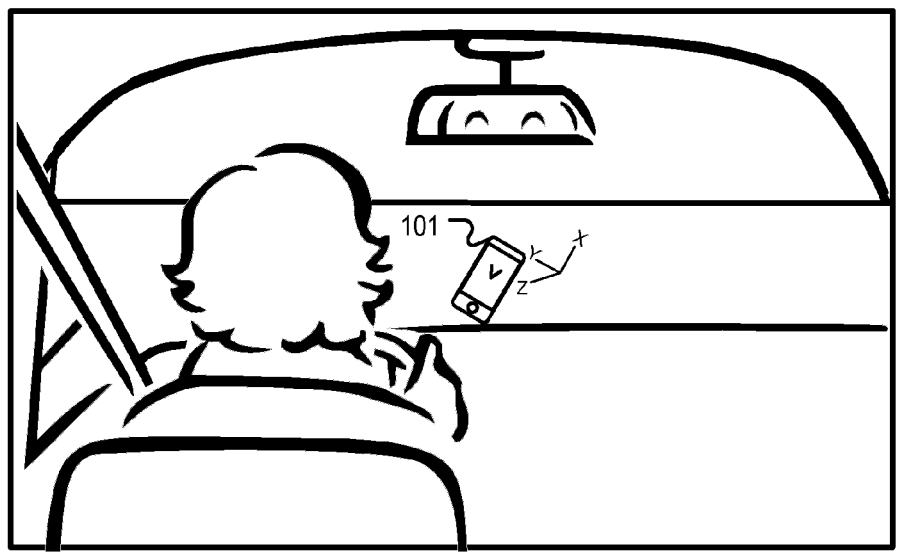
FIG. 1A illustrates mounting of a mobile device in a vehicle.

FIG. 1A illustrates mounting of a mobile device in a vehicle. A vehicle can be any mobile machine that transports passengers or cargo, including but not limited to cars, trucks, buses, motorcycles, trains, ships, boats, bicycles and aircraft. In this example use case, mobile device 101 is mounted on the dashboard of an automobile. Mobile device 101 can be any device that includes motion sensors and is capable of computing information that could be in error due to misalignment of the motion sensors with the direction of travel of the vehicle. An example mobile device 101 is a smart phone. The motion sensors can include any sensor capable of detecting the acceleration, velocity, orientation and direction of mobile device 101, including but not limited to positioning systems (satellite or network), accelerometers, gyroscopes and magnetometers.

In this example use case, the user (a driver) has rotated mobile device 101 in her direction so that she can gain a better view of the display screen. A right-handed Cartesian coordinate frame is fixed to mobile device 101. The positive x-axis points toward the top edge of mobile device 101, the positive y-axis points out of the left edge of mobile device 101 and the positive z-axis points out of the display screen. This coordinate system will hereinafter be referred to as "body coordinates."

Navigation software running on one or more processors onboard mobile device 101 maintain a current orientation and position of mobile device 101 in one or more reference coordinate systems by maintaining mathematical relationships between body coordinates and the reference coordinate systems using techniques (e.g., quaternions) well known in the field of navigation. The navigation software continuously receives data from the motion sensors and uses the data to compute an estimated orientation of mobile device 101 in body coordinates.

Mobile device 101 is capable of running a navigation application that displays navigation information such as turn-by-turn instructions, maps and compass heading. The compass heading can be computed using measurements output by a magnetometer of mobile device 101. The magnetometer measurements can be corrected for various bias errors. In some implementations, a compass "cone" can be displayed on mobile device 101. The vertex of the cone originates from a current position marker for the mobile device displayed on a map to indicate the direction of travel of the user. The interior angle of the cone represents error in the heading estimate where the larger the interior angle the more error there is in the heading estimate. An example compass metric for indicating heading error is described in U.S. Pat. No. 7,891,103, issued to Apple Inc. of Cupertino, Calif., which patent is incorporated by reference herein in its entirety.

When the user mounts mobile device 101 to the vehicle (e.g., mounted to the dashboard), the mounting is detected. In some implementations, mobile device 101 can determine that mobile device 101 has been mounted by observing over a period of time that mobile device 101 is in a mounting state. A mounting state could be based on a history of tilt angles (defined as an angle above the local horizontal) indicating an upright position of mobile device 101 (e.g., tilt angle is greater than 45 degrees) at a fixed position for a period of time, which is consistent with a dashboard mounted position. The history of tilt angles can be stored in a database on mobile device 101.

In some implementations, mobile device 101 can be mounted on a "dock" or other holding device that provides a signal to mobile device 101 that mobile device 101 is mounted. The user can also enter input into mobile device 101 indicating that mobile device 101 is mounted. In other implementations, mobile device 101 can learn that it is docked by obtaining an acceleration vector 102 while the vehicle is moving, as described below in reference to FIG. 1B.

Once mobile device 101 is mounted, a first mount angle is computed by one or more processors of mobile device 101 using information (e.g., angular rates, gravitational acceleration vector) generated by motion sensors (e.g., angular rate sensors, accelerometers) and the navigation software. In some implementations, the mount angle is defined as the angle Φ between an acceleration vector 102 directed along the front of the vehicle (in the direction of travel) and the negative z-axis in body coordinates when mobile device 101 is in a mounted state (e.g., upright position), as described in reference to FIG. 1B.

While the vehicle is moving, motion data is collected and stored. An example of motion data is linear acceleration data output from one or more accelerometers of mobile device 101. The acceleration data can be collected at scheduled intervals (e.g., every 5 minutes) or upon detection of a trigger event (e.g., when a threshold acceleration is exceeded) while the vehicle is moving. Acceleration data and de-acceleration data can be collected and stored in a storage device of mobile device 101 (e.g., memory). The stored data can be used to compute a motion vector or, in the present use case, used to compute a principle acceleration vector $\vec{a}$. The acceleration vector $\vec{a}$ can include three components, representing linear acceleration magnitudes $\alpha_x$, $\alpha_y$, $\alpha_z$ measure by accelerometers having their sensitive axes aligned along x, y, z body coordinates. A two-component acceleration vector can be used if mobile device 101 is fixed in one axis by a dock or other holding device.

Figure 1B:
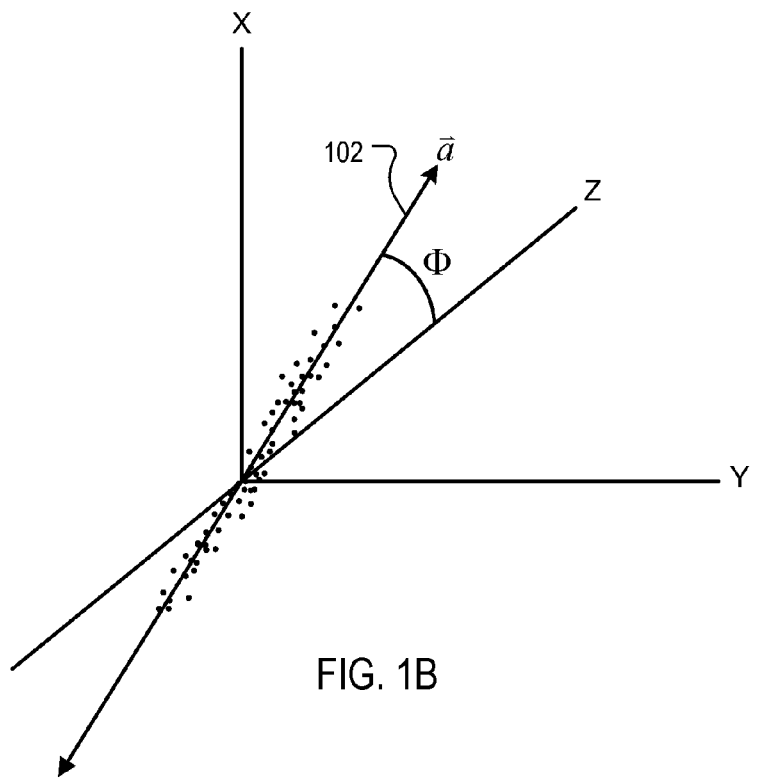
FIG. 1B illustrates an exemplary method of determining the collection of motion data for use in determining a mount angle of the mobile device.

FIG. 1B illustrates a locus of acceleration data points in body coordinates of mobile device 101 collected over time. For robustness, acceleration data points that may have a large amount of error are filtered out or discarded by using only acceleration data points that are part of a locus or cluster of data points. For example, an average acceleration data point can be calculated from the stored acceleration data points and any individual acceleration data point that exceeds a threshold distance (e.g., Euclidean distance) from the average acceleration data point can be excluded from further calculations. Other constraint equations or known clustering algorithms can be used to determine the locus of data points.

Once a locus of data points is determined, a principle acceleration vector a can be computed using, for example, regression analysis or a linear model, such that the principal acceleration vector $\vec{a}$ is fitted to the locus of data points in a statistical sense. For example, linear or multi-variable linear regression techniques can be used to generate a principal acceleration vector that "best fits" the locus of acceleration data points using a least squares formulation. In some implementations, only peak values of acceleration data points are used to compute the principle acceleration vector as described in reference to FIGS. 2A and 2B.

Once the principal acceleration vector $\vec{a}$ is determined, the current mount angle, Φ, can be determined by computing the angle between the acceleration vector $\vec{a}$ and the z vector in body coordinates, given by [1].

$$\Phi = \cos^{-1} \frac{\vec{a} \cdot \vec{z}}{|\vec{a}||\vec{z}|} \quad [1]$$

Figure 2A:
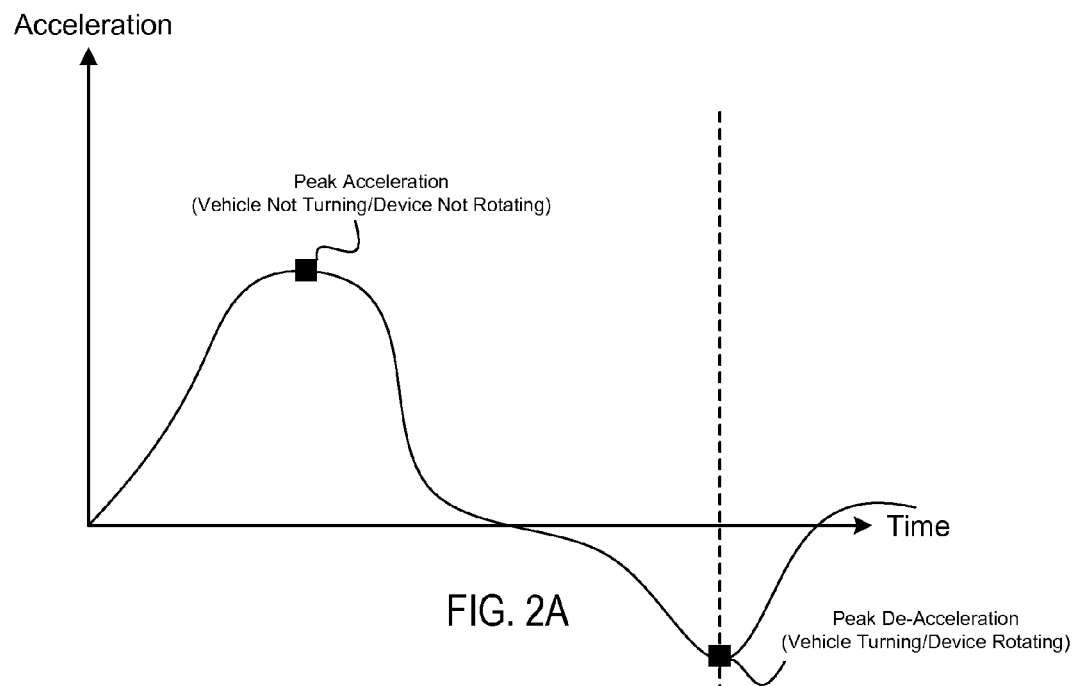
FIG. 2A is a plot of acceleration illustrating an exemplary method of selecting acceleration data for use in determining a mount angle of the mobile device.

FIG. 2A is a plot of acceleration illustrating an exemplary method of selecting acceleration data for use in determining a mount angle of the mobile device. To ensure an accurate computation of the principal acceleration vector $\vec{a}$, only peak values of the acceleration data that were collected when the vehicle was not turning, and when mobile device 101 was not rotating are used in the computation of the principal acceleration vector $\vec{a}$.

As illustrated in FIG. 2A, peak values of acceleration data (indicated by square markers) can be determined by looking for inflection points, where the acceleration is switching from positive to negative or vice versa. The inflection points can be determined by comparing consecutive (adjacent in time) values of acceleration data points and looking for a sign change or mathematically by, for example, taking the derivative of the acceleration data.

Figure 2B:
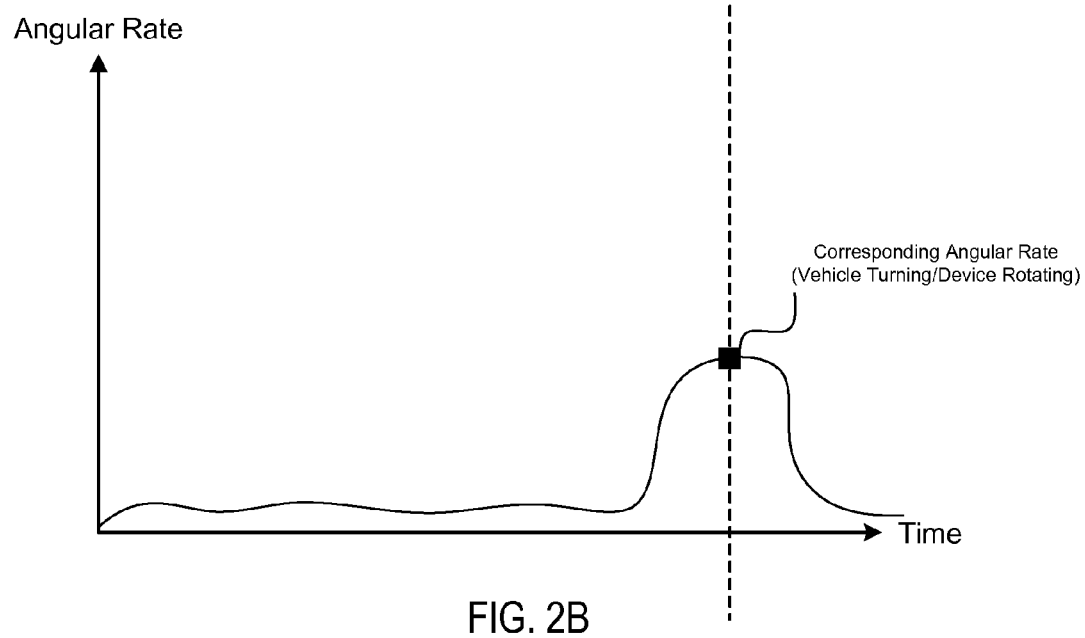
FIG. 2B is a plot of angular rate illustrating an exemplary method of selecting acceleration data for use in determining a mount angle of the mobile device.

Once the peak values of acceleration data points are determined, data from a second motion sensor, such as an angular rate sensor can be used to determine if the peak acceleration data values were obtained while the vehicle was turning or mobile device 101 was rotating. This test is illustrated in FIG. 2B, which is a plot of angular rate. Mobile device 101 may be rotating due to the user adjusting mobile device 101 while driving to gain a better view of the display screen.

Each acceleration measurement and angular rate measurement can be time stamped (time correlated) so that a determination can be made on whether the acceleration data was obtained while the vehicle was turning or mobile device 101 was rotating. In the example shown, the second peak acceleration data point coincides with an increase in angular rate as indicated by the vertical dashed line. Thus, in this example, the second peak acceleration data point (a peak de-acceleration point) would be excluded from calculation of the principal acceleration vector $\vec{a}$.

Figure 3:
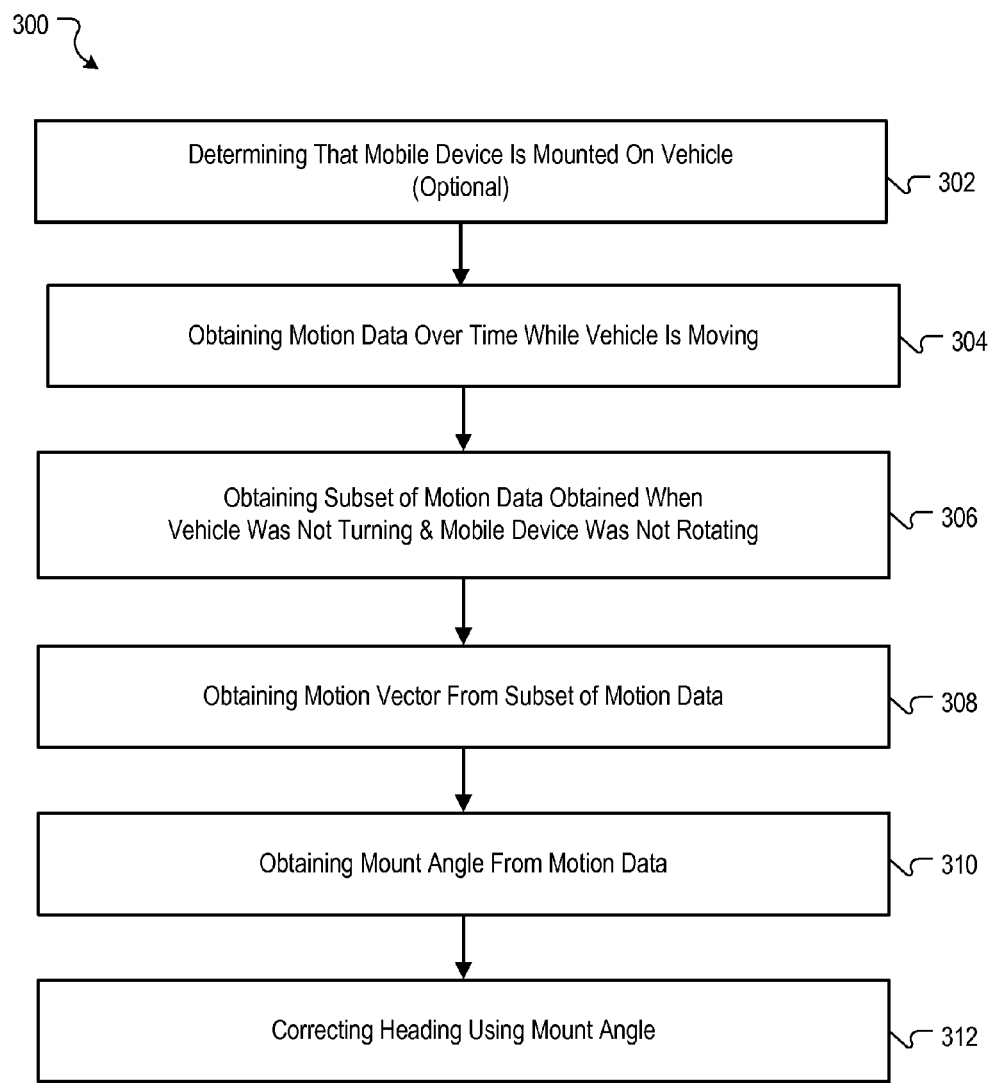
FIG. 3 is a flow diagram of an example process for determining a mount angle of the mobile device.

FIG. 3 is a flow diagram of an example process 300 for determining a mount angle of the mobile device. Process 300 can be implemented using architecture 400 as described in reference to FIG. 4

In some implementations, process 300 can begin by determining that the mobile device is mounted to the vehicle (302). For example, in some implementations the mobile device can determine that the mobile device is in a mounting state (e.g., fixed in an upright position). A "dock" or other holding device can also provide a signal to the mobile device indicating that the mobile device is mounted. In other implementations, the user inputs data into the mobile device that indicates that the mobile device is mounted. In other implementations, the mobile device can learn that it is docked by calculating an acceleration vector while the car is moving as described in subsequent steps 304-312 of process 300, in which case step 302 can be included in step 310.

Process 300 can continue by obtaining motion data over time while the vehicle is moving (304). For example, acceleration data and angular rate data can be obtained with timestamps from motion sensors, such as accelerometers and gyroscope sensors, and stored in the mobile device (e.g., stored memory). The data can be obtained at scheduled time intervals (e.g., every 5 minutes) or in response to a trigger event (e.g., each time a acceleration threshold is exceeded).

Process 300 can continue by obtaining a subset of peak motion data obtained when the vehicle was not turning and the mobile device was not rotating (306). For example, inflection points in the acceleration data can be identified to determine peak acceleration values and those peak acceleration values can be compared against corresponding angular rate data (corresponding or correlated in time) to determine if the peak acceleration values were obtained when the vehicle was turning or the mobile device was being rotated. In some implementations, the acceleration data and angular rate data are synchronized using timestamps before being compared.

Process 300 can continue by obtaining a motion vector from the subset of motion data (308). For example, a principal acceleration vector can be obtained from a locus of acceleration data points using a line-fitting algorithm, such as regression analysis (e.g., linear regression) or a linear model.

Process 300 can continue by obtaining a mount angle from the principal acceleration vector (310). For example, a mount angle can be defined as the angle between the principal acceleration vector and the z-axis in body coordinates, as described in reference to FIG. 1A and Equation [1].

Process 300 can continue by performing a heading correction based on the mount current mount angle (312). For example, the mount angle can be treated as an angle bias value that can be subtracted or added to an estimated heading angle obtained from magnetometer measurements or other sensor measurements. Correcting the estimated heading could cause a direction indicator (e.g., a compass "cone") to point in the direction of travel rather than being skewed to one side due to the mount angle. An example calculation of heading based on magnetometer measurements is described in U.S. Pat. No. 7,891,103.

Other Example Applications

In addition to correcting a heading estimate, the mount angle or mounting state can be used in other applications. For example, the mounting state can be used with other information to improve retrieval of compass calibration data, as described in co-pending U.S. patent application Ser. No. 13/913,420, for "Validating Calibrated Magnetometer Data," filed Jun. 8, 2013.

In another application, the mount angle can be used to determine if the driver or the passenger is viewing the display screen of the mobile device and then perform one or more responsive actions. For example, if the driver is looking at the display screen then certain functions can be engaged or disengaged (e.g., disengage video if driver is watching display screen) for safety or other reasons.

Example Mobile Device Architecture

Figure 4:
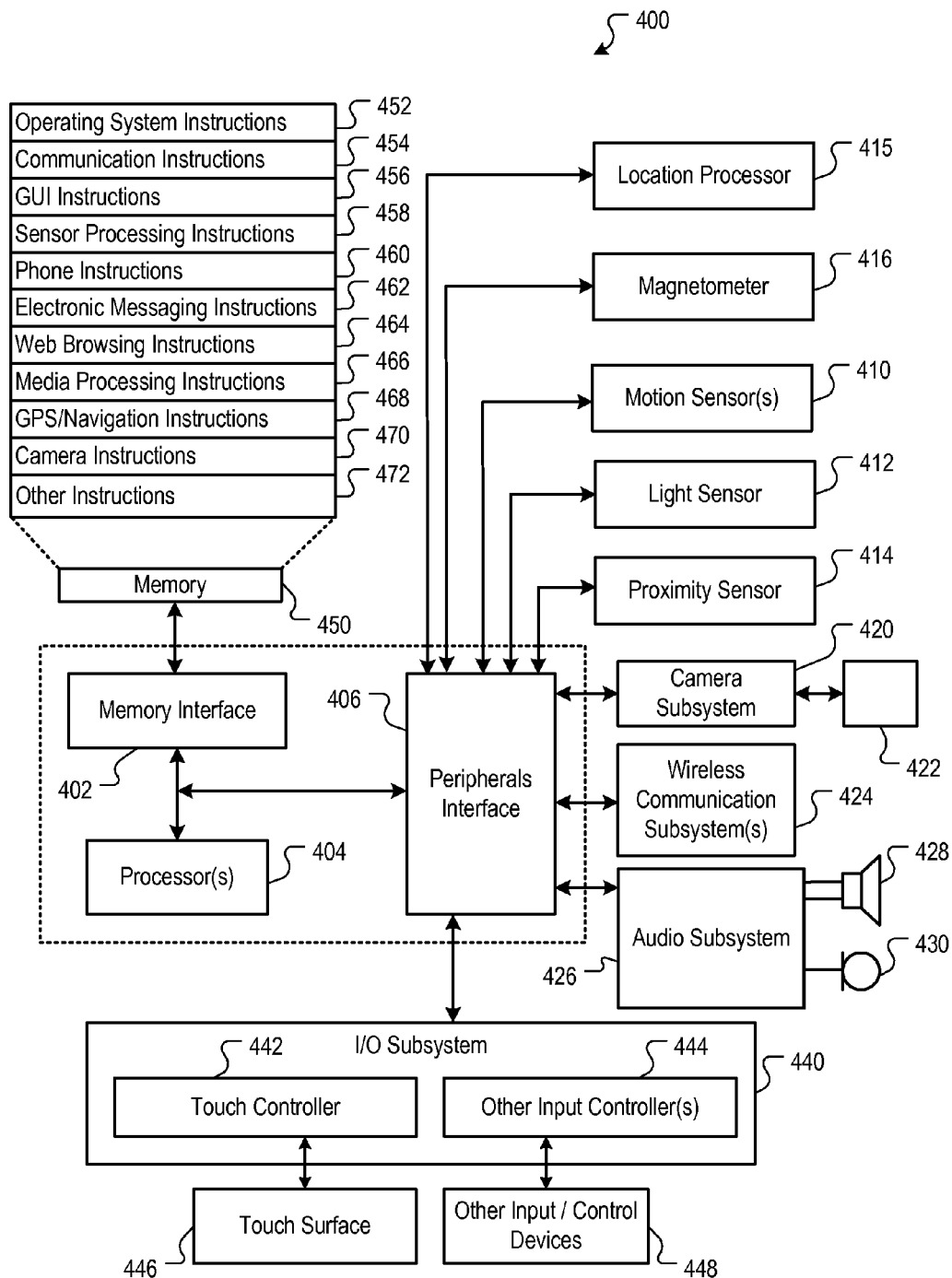
FIG. 4 is a block diagram of exemplary device architecture for implementing the features and processes described in reference to FIGS. 1-3.

FIG. 4 is a block diagram of exemplary mobile device architecture for implementing the features and processes described in reference to FIGS. 1-3.

Architecture 400 may be implemented in any device for generating the features described in reference to FIGS. 1-3, including but not limited to portable or desktop computers, smart phones and electronic tablets, television systems, game consoles, kiosks and the like. Architecture 400 may include memory interface 402, data processor(s), image processor(s) or central processing unit(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 406, such as a temperature sensor, a biometric sensor, or other sensing device, to facilitate related functionalities.

Location processor 415 (e.g., GPS receiver) may be connected to peripherals interface 406 to provide geo-positioning. Electronic magnetometer 416 (e.g., an integrated circuit chip) may also be connected to peripherals interface 406 to provide data that may be used to determine the direction of magnetic North. Thus, electronic magnetometer 416 may be used as an electronic compass.

Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 424. Communication subsystem(s) 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 424 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, and a Bluetooth™ network. Communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 426 may be coupled to a speaker 428 and one or more microphones 430 to facilitate voice-enabled functions, such as voice recognition, voice replication, digital recording, and telephony functions.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices, one or more computers or servers. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and instructions 472 for implementing some or all of the features and processes described in reference to FIGS. 1-3.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   obtaining motion data from a motion sensor of a mobile device mounted to a vehicle, where the motion data is obtained while the vehicle is moving;
   determining that the vehicle is not turning and the mobile device is not turning;
   responsive to the determining, obtaining a subset of the motion data;
   obtaining a motion vector from the subset of motion data; and
   obtaining a mounting angle from the motion vector,
   where the method is performed by one or more hardware processors.

2. The method of claim 1, further comprising:
   determining from the motion data that the mobile device is mounted in the vehicle.

3. The method of claim 2, where determining that a mobile device is mounted in a vehicle, comprises:
   determining that the mobile device is in a mounted state.

4. The method of claim 1, where obtaining a subset of motion data comprises:
   obtaining peak acceleration data obtained from a first motion sensor of the mobile device;
   comparing the peak acceleration data with angular rate data obtained from a second motion sensor; and
   obtaining the subset of motion data according to results of the comparing.

5. The method of claim 4, where obtaining peak acceleration data further comprises:
   determining an inflection point in the acceleration data.

6. The method of claim 1, where obtaining a motion vector from the subset of motion data further comprises:
   obtaining the motion vector from a locus of acceleration data points obtained over a period of time while the vehicle was moving.

7. The method of claim 6, where the motion vector is obtained from the locus of acceleration data points by fitting a line to the locus of acceleration data points.

8. The method of claim 7, where fitting a line to the locus of acceleration data points includes using regression analysis or a linear model.

9. The method of claim 1, further comprising:
   correcting a heading generated by the mobile device using the mount angle.

10. The method of claim 9, further comprising:
    adding the mount angle to a database on the mobile device for use in retrieving calibration data for calibrating a compass heading.

11. The method of claim 1, further comprising:
    determining whether a driver or passenger is driving the vehicle; and
    engaging or disengaging one or more functions or applications of the mobile device in response to the determining.

12. A system comprising:
    one or more processors;
    memory coupled to the one or more processors and configured to store instructions, which, when executed by the one or more processors, causes the one or more processors to perform operations comprising:
    obtaining motion data from a motion sensor of a mobile device mounted to a vehicle, where the motion data is obtained while the vehicle is moving;
    determining that the vehicle is not turning and the mobile device is not turning;
    responsive to the determining, obtaining a subset of the motion data;
    obtaining a motion vector from the subset of motion data; and
    obtaining a mounting angle from the motion vector.

13. The system of claim 12, further comprising:
    determining from the motion data that the mobile device is mounted to the vehicle.

14. The system of claim 13, where determining that a mobile device is mounted in a vehicle, comprises:
    determining that the mobile device is in a mounted state.

15. The system of claim 12, where obtaining a subset of motion data comprises:
    obtaining peak acceleration data obtained from a first motion sensor of the mobile device;
    comparing the peak acceleration data with angular rate data obtained from a second motion sensor; and obtaining the subset of motion data according to results of the comparing.

16. The system of claim 15, where obtaining peak acceleration data further comprises:
   determining an inflection point in the acceleration data.

17. The system of claim 12, where obtaining a motion vector from the subset of motion data further comprises:
   obtaining the motion vector from a locus of acceleration data points obtained over a period of time while the vehicle was moving.

18. The system of claim 17, where the motion vector is obtained from the locus of acceleration data points by fitting a line to the locus of acceleration data points.

19. The system of claim 18, where fitting a line to the locus of acceleration data points includes using regression analysis or a linear model.

20. The system of claim 12, further comprising:
   correcting a heading generated by the mobile device using the mount angle.

* * * * *